(12) United States Patent
Bonner et al.

(10) Patent No.: US 6,988,937 B2
(45) Date of Patent: Jan. 24, 2006

(54) METHOD OF ROLL GRINDING

(75) Inventors: Anne M. Bonner, Nashua, NH (US); Dean S. Matsumoto, Worcester, MA (US); Edward L. Lambert, Westboro, MA (US); Eric Bright, Fiskdale, MA (US)

(73) Assignee: Saint-Gobain Abrasives Technology Company, Worcester, MA (US)

(*) Notice: Subject to any disclaimer, the term of this patent is extended or adjusted under 35 U.S.C. 154(b) by 0 days.

(21) Appl. No.: 10/328,802

(22) Filed: Dec. 24, 2002

(65) Prior Publication Data

US 2003/0194954 A1 Oct. 16, 2003

Related U.S. Application Data

(63) Continuation-in-part of application No. 10/120,969, filed on Apr. 11, 2002, now Pat. No. 6,679,758.

(51) Int. Cl.
*B24B 1/00* (2006.01)

(52) U.S. Cl. .......................... 451/49; 451/541
(58) Field of Classification Search ............. 451/49, 451/41, 526–550
See application file for complete search history.

(56) References Cited

U.S. PATENT DOCUMENTS

| | | |
|---|---|---|
| 1,983,082 A | 12/1934 | Howe et al. |
| 2,194,472 A | 3/1940 | Jackson |
| 2,216,728 A | 10/1940 | Benner et al. |
| 3,048,482 A | 8/1962 | Hurst |
| 3,916,584 A | 11/1975 | Howard et al. |
| 3,955,324 A | 5/1976 | Lindstrom |
| 3,982,359 A | 9/1976 | Elbel et al. |
| 4,024,675 A | 5/1977 | Naidich et al. |
| 4,311,489 A | 1/1982 | Kressner |
| 4,393,021 A | 7/1983 | Eisenberg et al. |
| 4,486,200 A | 12/1984 | Heyer et al. ............ 51/295 |
| 4,541,842 A | 9/1985 | Rostoker |
| 4,575,384 A | 3/1986 | Licht et al. |
| 4,652,275 A | 3/1987 | Bloecher et al. |
| 4,671,017 A | 6/1987 | Ideue et al. ............ 51/49 |
| 4,799,939 A | 1/1989 | Bloecher et al. |
| 5,039,311 A | 8/1991 | Bloecher |
| 5,127,197 A | 7/1992 | Brukvoort et al. |
| 5,129,189 A | 7/1992 | Wetscher |
| 5,131,926 A * | 7/1992 | Rostoker et al. ............ 51/309 |
| 5,178,644 A | 1/1993 | Huzinec ............ 51/293 |
| 5,203,886 A | 4/1993 | Sheldon et al. ............ 51/309 |
| 5,273,558 A | 12/1993 | Nelson et al. |
| 5,489,204 A | 2/1996 | Conwell et al. |
| 5,500,273 A | 3/1996 | Holmes et al. |
| 5,607,489 A * | 3/1997 | Li ............ 51/309 |
| 5,651,729 A | 7/1997 | Benguerel |
| 5,738,695 A | 4/1998 | Harmer et al. |
| 5,738,696 A | 4/1998 | Wu |
| 5,738,697 A | 4/1998 | Wu et al. |
| 5,849,052 A | 12/1998 | Barber, Jr. |
| 5,863,308 A | 1/1999 | Qi et al. |
| 5,975,988 A | 11/1999 | Christianson |
| 6,074,278 A * | 6/2000 | Wu et al. ............ 451/28 |
| 6,086,467 A | 7/2000 | Imai et al. |
| 6,086,648 A * | 7/2000 | Rossetti et al. ............ 51/304 |
| 6,136,288 A | 10/2000 | Bauer et al. |
| 6,217,413 B1 | 4/2001 | Christianson |
| 6,319,108 B1 | 11/2001 | Adefris et al. |
| 6,354,929 B1 | 3/2002 | Adefris et al. |
| 6,394,888 B1 * | 5/2002 | Matsumoto et al. ........ 451/548 |

FOREIGN PATENT DOCUMENTS

| | | |
|---|---|---|
| GB | 491659 | 9/1938 |
| GB | 1228319 | 4/1971 |
| GB | 1418730 | 12/1975 |
| WO | 96/10471 | 4/1996 |
| WO | 98/03306 | 1/1998 |
| WO | 00/51788 | 9/2000 |
| WO | 01/04227 | 1/2001 |
| WO | 01/83166 A1 | 11/2001 |
| WO | 01/85393 A1 | 11/2001 |
| WO | 02/28802 A2 | 4/2002 |

* cited by examiner

*Primary Examiner*—Hadi Shakeri
(74) *Attorney, Agent, or Firm*—Mary E. Porter

(57) ABSTRACT

Grinding of mill rolls is carried out with chatter resistant abrasive grinding wheels having relatively low elastic modulus values and relatively high burst speed values. Grinding operations may be carried out at high efficiency with controlled wheel vibration, thus generating optimum surface quality on the ground mill rolls.

52 Claims, No Drawings

METHOD OF ROLL GRINDING

RELATED APPLICATIONS

This application is a continuation-in-part of U.S. Pat. No. 6,679,758, granted Jan. 20, 2004.

BACKGROUND OF THE INVENTION

The invention relates to a method of roll grinding and to abrasives tools used in roll grinding.

Roll grinding is a cylindrical grinding process wherein a bonded abrasive wheel grinds and smoothes the surface of a mill roll. A mill roll is a large (e.g., 7 feet in length, 2 feet in diameter) metal roller, typically made of forged steel, designed for use in the surface finishing of metal sheets. In grinding the surface of the mill roll, the grinding wheel must impart a uniform, smooth surface finish to the roll. Any imperfection, such as grinding patterns, feed lines, random marks, indentations, and the like, created on the roll surface during the grinding process will be transferred onto the metal sheets being processed by the roll.

With unstable grinding systems, the grinding conditions cause the vibration amplitude between the grinding wheel and the workpiece to increase over time. This results in a series of undulations that develop and build along the surfaces of both the grinding wheel and workpiece. This process is referred to as regenerative or self-excited chatter and has been associated with certain imperfections in the surface of mill rolls following grinding ("chatter marks"). Roll grinding operators want "chatter-resistant" grinding wheels, having the capacity to stay in a round shape and maintain a resilient character as grinding progresses and the wheel is worn. Grinding vibration models have been developed (Inasaki I., Grinding Chatter—Origin and Suppression, CIRP Proceedings, 2001) to explain the relationship between wheel properties (such as decreased contact stiffness, increased damping) and the suppression of self-excited chatter.

The roll grinding industry typically employs shellac bonded grinding wheels to minimize roll damage during grinding. In roll grinding wheels, shellac resin bonds are preferred for their relatively low elastic modulus (e.g., 1.3 GPa versus 5–7 GPa for phenolic resin bonds). Among the organic bonds used commercially in the manufacture of grinding wheels, phenolic bonds are preferred for strength, cost, availability, and manufacturing considerations. In contrast, shellac resins are natural materials collected from insects, are relatively costly, inconsistent in composition and quality, and more difficult to use in wheel manufacturing. Among the various types of organic bonded grinding wheels, shellac bonded wheels are characterized by relatively low mechanical strength, expressed as a relatively low "burst speed" (the rotational speed at which centrifugal force causes the wheel to fly apart), and as a shorter wheel life. In roll grinding operations, shellac wheels are limited to lower wheel rotation speeds (e.g., 4000 to 8000 sfpm) and shorter wheel life. The operation of the shellac wheel is troublesome, requiring frequent adjustments in wheel speed, infeed rate and other parameters to avoid chatter as the wheel diameter is reduced by wheel wear and vibration amplitude changes.

As an alternative to shellac wheels, it has been suggested in U.S. Pat. No. A-5,104,424 to use a combination of silicon carbide and sintered sol gel alumina grains in a high elastic modulus bond wheel to control the shape of the roll surface during grinding. This tool design has not been commercially useful.

Thus, there remains a need in the industry for better abrasive grinding tools and grinding procedures suitable for manufacture and reconditioning of mill rolls having a high quality surface finish delivered at an effective operational cost.

It has been discovered that unique grinding wheels made with common abrasive tool components, such as phenolic resin bond, and conventional alumina grain, preferably that has been agglomerated with selected binding materials, can be employed to yield more efficient roll grinding processes than the best known commercial roll grinding processes.

SUMMARY OF THE INVENTION

The invention is a method of grinding mill rolls, comprising the steps:
 a) providing a selected grinding wheel;
 b) mounting the wheel on a roll grinding machine;
 c) bringing the wheel into contact with a rotating mill roll having a cylindrical surface;
 d) traversing the wheel across the surface of the roll mill, maintaining continuous contact of the wheel with the surface of the roll mill; and
 e) grinding the surface of the roll mill to a surface finish value of 10 to 50 Ra, while leaving the surface substantially free of feed lines, chatter marks and surface irregularities.

In an alternative method of grinding mill rolls according to the invention, the method of roll grinding comprises the steps:
 a) providing a selected grinding wheel;
 b) mounting the wheel on a roll grinding machine and rotating the wheel;
 c) bringing the wheel into contact with a rotating mill roll having a cylindrical surface;
 d) traversing the wheel across the surface of the mill roll, maintaining continuous contact of the wheel with the surface of the mill roll;
 e) grinding the surface of the mill roll; and
 f) repeating steps c) to e);

wherein the wheel remains substantially free of chatter as the wheel is consumed by the grinding steps.

The chatter resistant grinding wheels useful in the method of the invention may be selected from:
 (a) wheels comprising abrasive grain, phenolic resin bond, 36 to 54 volume % porosity, a maximum cured density of 2.0 g/cc and a burst speed of at least 6000 sfpm;
 (b) wheels comprising at least 20 volume % agglomerates of abrasive grain, organic resin bond and 38 to 54 volume % porosity; and
 (c) wheels comprising 22 to 40 volume % abrasive grain and 36 to 54 volume % porosity bonded in an organic resin bond, and having a maximum elastic modulus value of 12 GPa and a minimum burst speed of 6000 sfpm;

DESCRIPTION OF THE PREFERRED EMBODIMENTS

Method of Grinding

The method of roll grinding of the invention is a cylindrical grinding process carried out with selected organic bonded grinding wheels having unusual wheel structures and physical properties. These wheels permit mill rolls to be surface finished faster and much more efficiently than was possible with methods of the prior art roll grinding using conventional grinding wheels. In the method of the invention, roll grinding is carried out without measurable wheel chatter damage over the life of the selected grinding wheels.

In the method of the invention, a selected grinding wheel is mounted on an arbor of a roll grinding machine and preferably rotated at about 4000 to 9500 sfpm, more preferably at 6000–8500 sfpm. When the selected grinding wheel is substituted for prior art wheels (e.g., shellac bonded wheels), this method permits operation at higher wheel rotational speeds without chatter, relative to the speeds maintained to avoid chatter in prior art methods (e.g., 4000 to 7000 sfpm). The chatter-resistant method may be carried out at any speed specified for the particular roll grinding machine being operated, provided the speed does not exceed the safety limitations of the selected wheel (i.e., the wheel burst speed limits).

Suitable roll grinding machines may be obtained from Herkules, Meuselwitz, Germany, Waldrich Siegen, Burbach, Germany, and Pomini (Techint Company), Milan, Italy, and from various other equipment manufacturers who supply equipment to the roll grinding industry.

After the rotating wheel is brought into contact with a rotating roll (at, e.g., 20 to 40 sfpm), the wheel is gradually traversed across the surface of the rotating roll to remove material from the surface, leaving a fine, smooth finish on the roll. Traversal across the roll is carried out at a rate of 100 to 150 inches per minute. On a typical roll measuring 7 feet in length and 2 feet in diameter the traversal step takes 0.6 to 1.0 minutes to complete. During this step, the wheel is in continuous contact with the surface of the roll, a condition known in the past to give rise to regenerative wheel vibration and chatter. Despite such continuous surface contact, wheel vibration amplitude is maintained at fairly consistent rate for the life of the wheel, and the wheel remains substantially free of chatter from the onset of grinding until the wheel is consumed by the grinding steps.

In carrying out the method of the invention, the ground roll surface finish must be free of undulations, lines, marks and other surface irregularities. If such irregularities remain, they will be transferred from the roll surface onto the surface of metal sheets being rolled by the defective roll. Significant manufacturing waste will result if the roll grinding process cannot be controlled in an efficient manner. In a preferred method, the surface of the roll is finished to a surface roughness measurement of about 10 to 50 Ra, preferably to a measurement of about 18 to 30 Ra. As used herein, "Ra" is an industry standard unit for surface finish quality representing the average roughness height, i.e., the average absolute distance from the mean line of the roughness profile within the evaluation length. The preferred grinding wheel has a sharp open face capable of creating a surface quality characterized by 160 to 180 peaks (or scratches) per inch. The peak count ("Pc", i.e., an industry standard representing the number of peaks per inch which project through a selected band centered about the mean line) is an important parameter of the surface of metal sheets that will be painted during the fabrication of automotive body parts. A surface with too few peaks is as undesirable as a surface with too many peaks or a surface with excessive roughness.

While the method of roll grinding described herein has been illustrated in a cold mill roll operation, the invention also is useful for finishing the surfaces of mill rolls used in hot mill roll operations. In grinding rolls used for cold mill roll operations, the selected grinding wheel preferably comprises 120 to 46 grit (142 to 508 microns) abrasive grain, whereas wheels used in the grinding of rolls for hot mill roll operations preferably comprise coarser grain sizes, e.g., 36 grit (710 micron) abrasive grain.

Abrasive Tools for Use in the Method of Grinding

The bonded abrasive wheels specified for carrying out the roll grinding process of the invention are characterized by a previously unknown combination of wheel structure and physical properties. As used herein, the term "wheel structure" refers to the relative volume percentages of abrasive grain, bond (including fillers, if any are used) and porosity contained in the grinding wheel. Wheel hardness "grade" refers to the letter designation given to the wheel's behavior in a grinding operation. For a given bond type, grade is a function of the wheel porosity, grain content and certain physical properties, such as cured density, elastic modulus and sand blast penetration (the later is more typical of vitrified bonded wheels). The "grade" of the wheel predicts how resistant to wear the wheel will be during grinding and how hard the wheel will grind, i.e., how much power will be needed to use the wheel in a given grinding operation. The letter designation for wheel grade is assigned according to a Norton Company grade scale known in the art, wherein the softest grades are designated A and the hardest grades are designated Z (see, e.g., U.S. Pat. No. A-1,983,082, Howe, et al). By matching wheel grades, one skilled in the art usually can substitute a new wheel specification for a known wheel and predict that the new wheel will perform in a manner similar to, or better than, the known wheel.

In a departure from known organic bonded wheel performance, the wheels specified for carrying out the roll grinding method herein are characterized by a lower grade, i.e., are softer, than known wheels delivering comparable performance efficiency. Wheels having a Norton grade of about B to G on a phenolic resin bond scale are preferred. The wheels useful in the invention exhibit lower elastic modulus values than known wheels having equivalent porosity volumes, but, quite unexpectedly, they exhibit higher G-ratio values (G-ratio is the ratio of material removal rate/wheel wear rate).

The bonded abrasive tools may have a density of less than 2.0 g/cc, preferably have a density of less than 1.8 g/cc, and more preferably have a density of less than 1.6 g/cc.

The bonded abrasive tools useful in the invention are grinding wheels comprising about 22 to 40 volume %, preferably 24 to 38 volume %, most preferably 26 to 36 volume % abrasive grain.

In a preferred embodiment, organic bonded abrasive tools comprise about 8 to 24 volume %, more preferably 10 to 22 volume %, and most preferably 12 to 20 volume % organic bond. Together with the abrasive grain and the bond, these tools comprise about 36 to 54 volume % porosity, preferably 36 to 50 volume % porosity, most preferably 40 to 50 volume % porosity, this porosity preferably including at least 30 volume % interconnected porosity. For any given wheel, the sum of the volume percentages of grain, bond and porosity equal 100%.

The organic bonded abrasive tools preferably comprise 20 to 38 volume % sintered abrasive grain agglomerates, 10 to 26 volume % organic bond and 38 to 50 volume % porosity. Porous abrasive grain agglomerates made with inorganic binding materials (e.g., vitrified or ceramic binding materials) are preferred for use in these grinding wheels because they permit the manufacture of an open wheel structure with interconnected porosity. In spite of the porosity volume achieved with these grain agglomerates, the wheels retain high mechanical strength, resistance to wheel wear and aggressive grinding performance characteristics of a grinding wheel having a much harder, grade designation.

The wheels useful in the invention have an elastic modulus of less than 12 GPa, preferably less than 10 GPa, and most preferably less than 8 GPa. Among other characteristics, a wheel manufactured with an effective amount (e.g., at least 30 volume % of the abrasive grain contents and at least 20 volume % of the total wheel volume after curing) of abrasives grain agglomerates exhibits a lower elastic modulus than standard roll grinding wheels. Standard wheels include those made to the same porosity contents without the use of abrasive grain agglomerates. The bonded abrasive tools of the invention have an unusually porous structure. In the tool structure, the average diameter of the sintered agglomerates is less than or equal to an average dimension of the pores of the interconnected porosity, when the interconnected porosity is measured at a point of a maximum opening.

The amount of interconnected porosity may be determined by measuring the fluid permeability of the tool according to the method of U.S. Pat. No. A-5,738,696. As used herein, Q/P=the fluid permeability of an abrasive tool, where Q means flow rate expressed as cc of air flow, and P means differential pressure. The term Q/P represents the pressure differential measured between the abrasive tool structure and the atmosphere at a given flow rate of a fluid (e.g., air). This relative permeability Q/P is proportional to the product of the pore volume and the square of the pore size. Larger pore sizes are preferred. Pore geometry and abrasive grain size are other factors affecting Q/P, with larger grit size yielding higher relative permeability.

The abrasive tools useful in the invention are characterized by higher fluid permeability values than prior art tools used in grinding mill rolls. In general, abrasive tools used in the grinding method of the invention preferably have fluid permeability values of at least about 30% higher than the values of prior art abrasive tools used in grinding mill rolls.

Exact relative fluid permeability parameters for particular agglomerate sizes and shapes, bond types and porosity levels may be determined by the practitioner by applying D'Arcy's Law to empirical data for a given type of abrasive tool.

The porosity within the abrasive wheel arises from the open spacing provided by the natural packing density of the tool components, particularly the abrasive agglomerates, and, optionally, by adding conventional pore inducing media. Suitable pore inducing media includes, but is not limited to, hollow glass spheres, hollow spheres or beads of plastic material or organic compounds, foamed glass particles, bubble mullite and bubble alumina, and combinations thereof. The tools may be manufactured with open-cell porosity inducers, such as beads of naphthalene, or other organic granules, which may be removed after molding the tool to leave void spaces within the tool matrix, or they may be manufactured with closed cell, hollow pore inducing media (e.g., hollow glass spheres). Preferred abrasive tools of the invention either do not contain added pore inducer media, or contain a minor amount of added pore inducer media effective to yield an abrasive tool with a porosity content of which at least 30%, by volume is interconnected porosity.

The finished tools optionally contain added secondary abrasive grains, fillers, grinding aids and pore inducing media, and combinations of these materials. When an abrasive grain is used in combination with the abrasive agglomerates, the agglomerates preferably provide from about 30 to about 100 volume % of the total abrasive grain of the tool and more preferably from about 40 to about 70 volume % of the total abrasive in the tool. When such secondary abrasive grains are used, these abrasive grains preferably provide from about 0.1 to about 70 volume % of the total abrasive grain of the tool, and more preferably, from about 30 to about 60 volume %. Suitable secondary non-agglomerated, abrasive grains include, but are not limited to, various aluminum oxides, sol gel alumina, sintered bauxite, silicon carbide, alumina-zirconia, aluminoxynitride, ceria, boron suboxide, cubic boron nitride, diamond, flint and garnet grains, and combinations thereof.

The abrasive tools of the present invention preferably are bonded with an organic bond. Any of the various thermosetting organic resin bonds known in the art of making abrasive tools may be selected for use herein. Phenolic resin bonds are preferred. Examples of suitable bonds and techniques for manufacturing such bonds may be found, for example, in U.S. Pat. Nos. 6,251,149 B1, 6,015,338, 5,976, 204, 5,827,337 and 3,323,885, which are hereby incorporated by reference. The bond and method of manufacture described in commonly assigned U.S. patent application Ser. No. 10/060,982, the contents of which are hereby incorporated by reference, and those of U.S. Pat. No. 3,323,885 are preferred for use herein. The organic bonded tools may be mixed, molded and cured or sintered according to various processing methods, and with various proportions of abrasive grain or agglomerate, bond and porosity components as are known in the art.

The density and hardness of the abrasive tools are determined by the selection of the agglomerates, type of bond and other tool components, the porosity contents, together with the size and type of mold and selected pressing process.

Abrasive wheels may be molded and pressed by any means known in the art, including hot, warm and cold pressing techniques. Care must be taken in selecting a molding pressure for forming the green wheels to avoid crushing an excessive amount of the abrasive grain agglomerates (e.g., more than 50%, by weight, of the agglomerates) and to preserve the three-dimensional structure of the agglomerates. The appropriate maximum applied pressure for making the wheels of the invention depends upon the shape, size, thickness and bond component of the abrasive wheel, and upon the molding temperature. The agglomerates of the invention have sufficient mechanical strength to withstand the molding and pressing steps carried out in typical commercial manufacturing processes for making abrasive tools.

The abrasive wheels may be cured by methods known to those skilled in the art. The curing conditions are primarily determined by the actual bond and abrasives used, and by the type of binding material contained in the abrasive grain agglomerate. Depending upon the chemical composition of the selected bond, an organic bond may be fired at 120 to 250° C., preferably 160 to 185° C., to provide the mechanical properties necessary for grinding metals or other materials.

Abrasive Agglomerates Used in the Grinding wheels

Abrasive grain agglomerates useful herein are three-dimensional structures or granules, including sintered porous composites of abrasive grain and binding material. The agglomerates have a loose packing density (LPD) of $\leq 1.6$ g/cc, an average dimension of about 2 to 20 times the average abrasive grit size, and a porosity of about 30 to 88%, by volume. The abrasive grain agglomerates preferably have a minimum crush strength value of 0.2 MPa.

The abrasive grain may include one or more of the abrasive grains known for use in abrasive tools, such as the alumina grains, including fused alumina, sintered and sol gel sintered alumina, sintered bauxite, and the like, silicon carbide, alumina-zirconia, aluminoxynitride, ceria, boron suboxide, garnet, flint, diamond, including natural and synthetic diamond, cubic boron nitride (CBN), and combinations thereof. Any size or shape of abrasive grain may be used. For example, the grain may include elongated sintered sol gel alumina grains having a high aspect ratio of the type disclosed in U.S. Pat. No. 5,129,919.

Grain sizes suitable for use herein are in the regular abrasive grit size range (e.g., greater than 60 and up to 7,000 microns). For a given abrasive grinding operation, it may be desirable to agglomerate an abrasive grain with a grit size smaller than an abrasive grain (non-agglomerated) grit size normally selected for this abrasive grinding operation. For example, agglomerated 80 grit size abrasive may be substituted for 54 grit abrasive, agglomerated 100 grit for 60 grit abrasive and agglomerated 120 grit for 80 grit abrasive.

The preferred sintered agglomerate size for typical abrasive grains ranges from about 200 to 3,000, more preferably 350 to 2,000, most preferably 425 to 1,000 micrometers in average diameter.

The abrasive grain is present at about 10 to 65 volume %, more preferably 35 to 55 volume %, and most preferably 48 to 52 volume % of the agglomerate.

Binding materials useful in making the agglomerates preferably include ceramic and vitrified materials, preferably of the sort used as bond systems for vitrified bonded abrasive tools. These vitrified bond materials may be a pre-fired glass ground into a powder (a frit), or a mixture of various raw materials such as clay, feldspar, lime, borax, and soda, or a combination of fritted and raw materials. Such materials fuse and form a liquid glass phase at temperatures ranging from about 500 to 1400° C. and wet the surface of the abrasive grain to create bond posts upon cooling, thus holding the abrasive grain within a composite structure. Examples of suitable binding materials for use in the agglomerates are given in Table 1-1, below. Preferred binding materials are characterized by a viscosity of about 345 to 55,300 poise at 1180° C., and by a melting temperature of about 800 to 1,300° C.

In a preferred embodiment, the binding material is a vitrified bond composition comprising a fired oxide composition of 71 wt % $SiO_2$ and $B_2O_3$, 14 wt % $Al_2O_3$, less than 0.5 wt % alkaline earth oxides and 13 wt % alkali oxides.

The binding material also may be a ceramic material, including, but not limited to, silica, alkali, alkaline-earth, mixed alkali and alkaline-earth silicates, aluminum silicates, zirconium silicates, hydrated silicates, aluminates, oxides, nitrides, oxynitrides, carbides, oxycarbides and combinations and derivatives thereof. In general, ceramic materials differ from glassy or vitrified materials in that the ceramic materials comprise crystalline structures. Some glassy phases may be present in combination with the crystalline structures, particularly in ceramic materials in an unrefined state. Ceramic materials in a raw state, such as clays, cements and minerals, may be used herein. Examples of specific ceramic materials suitable for use herein include, but are not limited to, silica, sodium silicates, mullite and other alumino silicates, zirconia-mullite, magnesium aluminate, magnesium silicate, zirconium silicates, feldspar and other alkali-alumino-silicates, spinels, calcium aluminate, magnesium aluminate and other alkali aluminates, zirconia, zirconia stabilized with yttria, magnesia, calcia, cerium oxide, titania, or other rare earth additives, talc, iron oxide, aluminum oxide, bohemite, boron oxide, cerium oxide, alumina-oxynitride, boron nitride, silicon nitride, graphite and combinations of these ceramic materials.

The binding material is used in powdered form and may be added to a liquid vehicle to insure a uniform, homogeneous mixture of binding material with abrasive grain during manufacture of the agglomerates.

A dispersion of organic binders is preferably added to the powdered binding material components as molding or processing aids. These binders may include dextrins, starch, animal protein glue, and other types of glue; a liquid component, such as water, solvent, viscosity or pH modifiers; and mixing aids. Use of organic binders improves agglomerate uniformity, particularly the uniformity of the binding material dispersion on the grain, and the structural quality of the pre-fired or green agglomerates, as well as that of the fired abrasive tool containing the agglomerates. Because the binders burn off during firing of the agglomerates, they do not become part of the finished agglomerate nor of the finished abrasive tool.

An inorganic adhesion promoter may be added to the mixture to improve adhesion of the binding materials to the abrasive grain as needed to improve the mix quality. The inorganic adhesion promoter may be used with or without an organic binder in preparing the agglomerates.

Although high temperature fusing binding materials are preferred in the agglomerates of the invention, the binding material also may comprise other inorganic binders, organic binders, organic bond materials, metal bond materials and combinations thereof. Binding materials used in the abrasive tool industry as bonds for organic bonded abrasives, coated abrasives, metal bonded abrasives and the like are preferred.

The binding material is present at about 0.5 to 15 volume %, more preferably 1 to 10 volume %, and most preferably 2 to 8 volume % of the agglomerate.

The preferred volume % porosity within the agglomerate is as high as technically possible within the agglomerate mechanical strength limitations needed to manufacture an abrasive tool and to grind with it. Porosity may range from 30 to 88 volume %, preferably 40 to 80 volume % and most preferably, 50–75 volume %. A portion (e.g., up to about 75 volume %) of the porosity within the agglomerates is preferably present as interconnected porosity, or porosity permeable to the flow of fluids, including liquids (e.g., grinding coolant and swarf), air and molten resin bond material during wheel curing. It is believed organic bond materials migrate into the interstitial voids of the sintered abrasive grain agglomerates while the wheel is being thermally cured, thereby strengthening the grain bond and opening the wheel structure to previously unachievable porosity volumes without an expected loss of mechanical strength.

The density of the agglomerates may be expressed in a number of ways. The bulk density of the agglomerates may be expressed as the LPD. The relative density of the agglomerates may be expressed as a percentage of initial relative density, or as a ratio of the relative density of the agglomerates to the components used to make the agglomerates, taking into account the volume of interconnected porosity in the agglomerates.

The initial average relative density, expressed as a percentage, may be calculated by dividing the LPD ($\rho$) by a theoretical density of the agglomerates ($\rho_0$), assuming zero porosity. The theoretical density may be calculated according to the volumetric rule of mixtures method from the weight percentage and specific gravity of the binding material and of the abrasive grain contained in the agglomerates. For the sintered agglomerates of the invention, a maximum percent relative density is 50 volume %, with a maximum percent relative density of 30 volume % being more preferred.

The relative density may be measured by a fluid displacement volume technique so as to include interconnected porosity and exclude closed cell porosity. The relative density is the ratio of the volume of the sintered agglomerate measured by fluid displacement to the volume of the materials used to make the sintered agglomerate. The volume of the materials used to make the agglomerate is a measure of the apparent volume based on the quantities and packing densities of the abrasive grain and binder material used to make the agglomerates. For the sintered agglomerates of the invention, a maximum relative density of the sintered agglomerates preferably is 0.7, with a maximum relative density of 0.5 being more preferred.

Agglomerates used in the bonded abrasive tools herein may be manufactured by the methods disclosed in commonly owned U.S. application Ser. No. 10/120,969, which is hereby incorporated by reference. As disclosed therein, a simple mixture of the grain and binding material (optionally with an organic binder) is fed into a rotary calcination apparatus and the binder is fired (e.g., about from about 650 to about 1400° C.) to form a glass or vitrified bond holding the abrasive grain together in an agglomerate. When agglomerating abrasive grain with lower temperature curing (e.g., about from about 145 to about 500° C.) binding materials, an alternative embodiment of this rotary kiln apparatus may be used. The alternative embodiment, a rotary dryer, is equipped to supply heated air to the discharge end of the tube to heat the abrasive grain mixture, cure the binding material, bonding it to the grain, and thereby agglomerate the abrasive grain as it is collected from the apparatus. As used herein, the term "rotary calcination kiln" includes such rotary dryer devices.

In another method of making the abrasives grain agglomerates, a paste may be made of the binding materials and grain with an organic binder solution and extruded into elongated particles with the apparatus and method disclosed in U.S. Pat. No. A-4,393,021, and then sintered.

In a dry granulation process, a sheet or block made of abrasive grain imbedded in dispersion or paste of the binding material may be dried and then a roll compactor may be used to break the composite of grain and binding material, followed by a sintering step.

In another method of making green or precursor agglomerates, the mixture of the binding material and the grain may be added to a molding device and the mixture molded to form precise shapes and sizes, for example, in the manner disclosed in U.S. Pat. No. 6,217,413 B1.

In another process useful herein for making agglomerates, a mixture of the abrasive grain, binding materials and an organic binder system is fed into an oven, without pre-agglomeration and heated. The mixture is heated to a temperature high enough to cause the binding material to melt, flow and adhere to the grain, then cooled to make a composite. The composite is crushed and screened to make the sintered agglomerates.

The following Examples are provided by way of illustration of the invention, and not by way of limitation.

EXAMPLE 1

Abrasive Grain/Vitrified Binder Agglomerates

Vitrified binding materials (see Table 1-1, footnotes b and c) were used to make agglomerated abrasive grain samples AV2 and AV3. The agglomerates were prepared according to the rotary calcination method described in U.S. Ser. No. 10/120,969, Example 1 using the materials described below. The AV2 agglomerates were made with 3 wt. % Binder A. The calciner temperature was set at 1250° C., the tube angle was 2.5 degrees and the rotation speed was 5 rpm. The AV3 agglomerates were made with 6 wt. % Binder E, at a calciner temperature of 1200° C., with a tube angle of 2.5–4° and a rotation speed of 5 rpm. The abrasive grain was a fused alumina 38A abrasive grain, 80 grit size, obtained from Saint-Gobain Ceramics & Plastics, Inc., Worcester, Mass., USA.

The vitrified grain agglomerates were tested for loose packing density, relative density and size. Test results are listed in Table 1-1 below. Agglomerates consisted of a plurality of individual abrasive grits (e.g., 2 to 40 grits) bonded together by vitrified binding material at grit to grit contact points, together with visible void areas. The majority of the agglomerates were sufficiently resistant to compaction to retain a three dimensional character after being subjected to abrasive wheel mixing and molding operations.

TABLE 1-1

Abrasive Grain/Vitrified Binder Agglomerates

| Sample No. Mix: grain, binding material | Weight lbs (kg) of mix | Wt % Abrasive Grain | Binding material Wt % | Volume % binding material[a] | LPD g/cc −20/+45 mesh fraction | Average size microns (mesh) | Average % relative density |
|---|---|---|---|---|---|---|---|
| AV2 80 grit 38A, Binder A[b] | 84.94 (38.53) | 94.18 | 2.99 | 4.81 | 1.036 | 500μ −20/+45 | 26.67 |
| AV3 80 grit 38A Binder E[c] | 338.54 (153.56) | 88.62 | 6.36 | 9.44 | 1.055 | 500μ −20/+45 | 27.75 |

[a]The percentages are on a total solids basis, only include the vitrified binder material and abrasive grain, and exclude any porosity within the agglomerates. Temporary organic binder materials were used to adhere the vitrified bond to the abrasive grain (for AV2, 2.83 wt % AR30 liquid protein binder was used, and for AV3, 3.77 wt % AR30 liquid protein binder was used). The temporary organic binder materials were burned out during the sintering of the agglomerates in the rotary calciner and the final wt % binding material does not include them.
[b]Binder A (described in U.S. Ser. No. 10/120,969, Example 1) is a mixture of raw materials (e.g., clay and minerals) commonly used to make vitrified bonds for abrasive grinding wheels. Following agglomeration, the sintered glass composition of Binder A includes the following oxides (wt %): 69% glass formers ($SiO_2$ + $B_2O_3$); 15% $Al_2O_3$; 5–6% alkaline earth oxides RO (CaO, MgO); 9–10% Alkali $R_2O$ ($Na_2O$, $K_2O$, $Li_2O$), and has specific gravity of 2.40 g/cc and an estimated viscosity at 1180° C. of 25,590 Poise.
[c]Binder E (described in U.S. Ser. No. 10/120,969, Example 1) is a mixture of raw materials (e.g., clay and minerals) commonly used to make vitrified bonds for abrasive grinding wheels. Following agglomeration, the sintered glass composition of Binder E includes the following oxides (wt %): 64% glass formers ($SiO_2$ + $B_2O_3$); 18% $Al_2O_3$; 6–7% alkaline earth oxides RO (CaO, MgO); 11% Alkali $R_2O$ ($Na_2O$, $K_2O$, $Li_2O$), and has specific gravity of 2.40 g/cc and an estimated viscosity at 1180° C. of 55,300 Poise.

Abrasive Wheels

Agglomerate samples AV2 and AV3 were used to make experimental abrasive grinding wheels (type 1) (finished size 5.0×0.5×1.250 inch (12.7×1.27×3.18 cm).

The experimental wheels were made by adding the agglomerates to a rotating paddle mixer (a Foote-Jones mixer, obtained from Illinois Gear, Chicago, Ill.), and blending with the agglomerates a liquid phenolic resin (V-1181 resin from Honeywell International Inc., Friction Division, Troy N.Y.) (22 wt % of resin mixture). A powdered phenolic resin (Durez Varcum® resin 29–717 obtained from Durez Corporation, Dallas Tex.) (78 wt % of resin mixture) was added to the wet agglomerates. The weight percent quantities of abrasive agglomerate and resin bond used to make these wheels and the composition of the finished wheels (including volume % abrasive, bond and porosity in the cured wheels) are listed in Table 1-2, below.

The materials were blended for a sufficient period of time to get a uniform blend and minimize the amount of loose bond. After blending, the clumps of resin. The uniform agglomerate and bond mixture was placed into molds and pressure was applied to form green stage (uncured) wheels. These green wheels were removed from the molds, wrapped in coated paper and cured by heating to a maximum temperature of 160° C., graded, finished, and inspected according to commercial grinding wheel manufacturing techniques known in the art. Finished wheel elastic modulus was measured and results are shown in Table 1-2 below.

Elastic modulus was measured using a Grindosonic machine, by the method described in J. Peters, "Sonic Testing of Grinding Wheels" *Advances in Machine Tool Design and Research*, Pergamon Press, 1968.

TABLE 1-2

Wheel Compositions

| Wheel Sample (Agglomerate) Grade | Elastic Modulus G-pascal | Cured Density g/cc | Abrasive Grain | Bond Total[c] (organic) | Porosity | Weight % Agglomerate | Weight % Bond |
|---|---|---|---|---|---|---|---|
| Experimental Wheels | | | | | | | |
| 1-1 (AV3) A | 3.5 | 1.437 | 30 | 18 (14.8) | 52 | 86.9 | 13.1 |
| 1-2 (AV3) C | 4.5 | 1.482 | 30 | 22 (18.8) | 48 | 84.0 | 16.0 |
| 1-3 (AV3) E | 5.0 | 1.540 | 30 | 26 (22.8) | 44 | 81.2 | 18.8 |
| 1-4 (AV2) A | 5.5 | 1.451 | 30 | 18 (16.7) | 52 | 85.1 | 14.9 |
| 1-5 (AV2) E | 7.0 | 1.542 | 30 | 26 (24.7) | 44 | 79.4 | 20.6 |

| Comparative Wheels[a] commercial designation | Elastic Modulus | Cured Density g/cc | Grain Vol % | Bond Vol % | Porosity vol % | Weight % Abrasive | Weight % Bond |
|---|---|---|---|---|---|---|---|
| C-1 38A80-G8 B24 | 13 | 2.059 | 48 | 17 | 35 | 89.7 | 10.3 |
| C-2 38A80-K8 B24 | 15 | 2.154 | 48 | 22 | 30 | 87.2 | 12.8 |
| C-3 38A80-O8 B24 | 17 | 2.229 | 48 | 27 | 25 | 84.4 | 15.6 |
| C-4 53A80J7 Shellac Blend | 10.8 | 1.969 | 50 | 20 | 30 | 89.2 | 10.8 |
| C-5 53A80L7 Shellac Blend | 12.0 | 2.008 | 50 | 24 | 26 | 87.3 | 12.7 |
| C-6[b] National Shellac Bond A80-Q6ES | 9.21 | 2.203 | 48.8 | 24.0 | 27.2 | 86.9 | 13.1 |
| C-7[b] Tyrolit Shellac Bond FA80-11E15SS | 8.75 | 2.177 | 47.2 | 27.4 | 25.4 | 84.9 | 15.1 |

[a] The C-1, C-2 and C-3 wheels are made with a phenolic resin bond and these wheel specifications are commercially available from Saint-Gobain Abrasives, Inc. The C-4 and C-5 wheels are made from a shellac resin blended with a minor amount of phenolic resin bond. These wheel specifications are commercially available from Saint-Gobain Abrasives, Inc., Worcester, MA. These samples C-4 and C-5 were prepared in the laboratory according to these commercial specifications, and were cured to a final wheel hardness grade of J and L, respectively.
[b] The C-6 and C-7 wheels were not tested in the grinding tests. These comparative wheel specifications are commercially available from National Grinding Wheel Company/Radiac, Salem, IL, and from Tyrolit N.A., Inc., Westboro, MA.
[c] The "Total" volume % of bond is the sum of the amount of vitrified binder material used to agglomerate the grain and the amount of organic resin bond used to make the grinding wheel. The "(organic)" volume % of bond is the portion of the Total volume % bond consisting of the organic resin added to the agglomerates to make the grinding wheel.

Grinding Tests

The experimental wheels were tested in a simulated roll grinding test in comparison with commercially available wheels bonded with phenolic resin (C-1-C-3, obtained from 'saint-Gobain Abrasives, Inc., Worcester, Mass.). Shellac bonded wheels prepared in the laboratory (C-4 and C-5) from a shellac resin blend also were tested as comparative wheels. Comparative wheels were selected because they had compositions, structures and physical properties equivalent to those wheels used in commercial roll grinding operations.

To simulate roll grinding in a laboratory setting, a continuous contact slot grinding operation was conducted on a surface grinding machine. The following grinding conditions were employed in the tests.

Grinding machine: Brown & Sharpe surface grinder
Mode: two continuous contact slot grinds, reversal at end of stroke prior to loss of contact with workpiece
Coolant: Trim Clear 1:40 ratio coolant:deionized water
Workpiece: 16×4 inch 4340 steel, hardness Rc50
Workpiece speed: 25 feet/min.
Wheel speed: 5730 rpm
Downfeed: 0.100 inch total
Depth of cut: 0.0005 inch at each end
Contact time: 10.7 minutes
Dressing: Single point diamond, at 10 inch/min crossfeed, 0.001 inch comp.

Wheel vibration during grinding was measured with IRD Mechanalysis equipment (Analyzer Model 855 Analyzer/Balancer, obtained from Entek Corporation, North Westerville, Ohio). In an initial grinding run, vibration levels at various frequencies (as velocity in inches/second units) were recorded, using a fast fourier transform (FFT) procedure, at two and eight minutes after dressing the wheel. After the initial grinding run, a second grinding run was made and time-related growth in vibration level was recorded at a selected, target frequency (57000 cpm, the frequency observed during the initial run) during the entire 10.7 minutes the wheel remained in contact with the workpiece. Wheel wear rates (WWR), material removal rates (MRR) and other grinding variables were recorded as the grinding runs were made. These data, together with the vibration amplitude for each wheel after 9–10 minutes of continuous contact grinding, are shown in Table 1-3, below.

TABLE 1-3

Grinding Test Results

| Wheel Sample (Agglomerate) Grade | Vibration Amplitude 9–10 min. in/sec | WWR in³/min | Power 9–10 min. hp | SGE J/mm³ | G-ratio MRR/WWR |
|---|---|---|---|---|---|
| Experimental Wheels | | | | | |
| 1-1 (AV3) A | 0.010 | 0.00215 | 10.00 | 22.70 | 34.5 |
| 1-2 (AV3) C | 0.011 | 0.00118 | 15.00 | 29.31 | 63.3 |
| 1-3 (AV3) E | 0.021 | 0.00105 | 22.00 | 43.82 | 71.4 |
| 1-4 (AV2) A | 0.011 | 0.00119 | 10.50 | 23.67 | 62.7 |
| 1-5 (AV2) E | 0.013 | 0.00131 | 21.00 | 40.59 | 56.6 |
| Comparative Wheels (commercial designation) | | | | | |
| C-1 38A80-G8 B24 | 0.033 | 0.00275 | 10.00 | 33.07 | 26.5 |
| C-2 38A80-K8 B24 | 0.055 | 0.00204 | 11.00 | 25.33 | 36.8 |
| C-3 38A80-O8 B24 | 0.130 | 0.00163 | 12.50 | 22.16 | 46.2 |
| C-4 53A80J7 Shellac Blend | 0.022 | 0.00347 | 10.00 | 25.46 | 20.8 |
| C-5 53A80L7 Shellac Blend | 0.052 | 0.00419 | 11.50 | 26.93 | 17.1 |

It can be seen that the experimental wheels displayed the lowest wheel wear rate and the lowest vibration amplitude values. The comparative, commercial wheels made with phenolic resin bonds (38A80-G8 B24, -K8 B24 and -O8 B24) had low wheel wear rates, but had unacceptably high vibration amplitude values. These wheels would be predicted to create vibration chatter in an actual roll grinding operation. The comparative wheels made with shellac resin bonds (53A80J7 Shellac Blend and 53A80L7 Shellac Blend), had high wheel wear rates but acceptably low vibration amplitude values. The experimental wheels were superior to all comparative wheels over a range of power levels (nearly constant vibration amplitude at 10–23 hp and consistently lower WWR) and the experimental wheels displayed superior G-ratios (wheel wear rate/material removal rate), evidencing excellent efficiency and wheel life.

It is believed that the relatively low elastic modulus and relatively high porosity of the experimental wheels creates a chatter resistant wheel without sacrifice of wheel life and grinding efficiency. Quite unexpectedly, the experimental wheels were observed to grind more efficiently than wheels containing higher volume percentages of grain and having a harder wheel grade. Although the experimental wheels were constructed to yield a relatively soft grade of hardness (i.e., grade A–E on the Norton Company grinding wheel hardness scale), they ground more aggressively, with less wheel wear, yielding a higher G-ratio than the comparative wheels having a significantly harder grade value (i.e., grades G–O on the Norton Company grinding wheel hardness scale). These results were significant and unexpected.

EXAMPLE 2

Experimental wheels containing agglomerated grain were prepared in a commercial manufacturing operation and tested in a commercial roll grinding operation where shellac bonded wheels have been used in the past.

Abrasive Grain/Vitrified Binding Material Agglomerates

Vitrified binding materials (Binder A from Table 1-1, above) were used to make agglomerated abrasive grain sample AV4. Sample AV4 was similar to sample AV2, except that a commercial batch size was manufactured for sample AV4. The agglomerates were prepared according to the rotary calcination method described in U.S. Ser. No 10/120,969, Example 1. The abrasive grain was a fused alumina 38A abrasive grain, 80 grit size, obtained from Saint-Gobain Ceramics & Plastics, Inc., Worcester, Mass., USA, and 3 wt. % Binder A was used. The calciner temperature was set at 1250° C., the tube angle was 2.5 degrees and the rotation speed was 5 rpm. The agglomerates were treated with 2% silane solution (obtained from Crompton Corporation, South Charleston, W. Va.).

Abrasive Wheels

Agglomerate sample AV4 was used to make grinding wheels (finished size 36" diameter X 4" width X 20" center hole (type 1) (91.4×10.2×50.8 cm).

The experimental abrasive wheels were made with commercial manufacturing equipment by mixing the agglomerates with liquid phenolic resin (V-1181 resin from Honeywell International Inc., Friction Division, Troy N.Y.) (22 wt % of resin mixture) and powdered phenolic resin (Durez Varcum® resin 29-717 obtained from Durez Corporation, Dallas Tex.) (78 wt % of resin mixture). The weight percent quantities of abrasive agglomerate and resin bond used in these wheels are listed in Table 2-2, below. The materials were blended for a sufficient period of time to get a uniform blend. The uniform agglomerate and bond mixture was placed into molds and pressure was applied to form green stage (uncured) wheels. These green wheels were removed from the molds, wrapped in coated paper and cured by heating to a maximum temperature of 160° C., graded, finished, and inspected according to commercial grinding wheel manufacturing techniques known in the art. Finished wheel elastic modulus and fired density were measured and results are shown in Table 2-2 below. Wheel burst speed was measured and the maximum operational speed was determined to be 9500 sfpm.

The composition of the wheels (including volume % abrasive, bond and porosity in the cured wheels) are described in Table 2-2. These wheels had a visibly open, uniform, porosity structure unknown in organic bonded grinding wheels previously made in a commercial operation.

TABLE 2-2

| | | Wheel Composition | | | | | |
|---|---|---|---|---|---|---|---|
| | | | Wheel Composition Volume % | | | | |
| Wheel Sample (Agglomerate) Grade, Structure | Elastic Modulus G-pascal | Cured Density g/cc | Abrasive Grain | Bond Total[a] (organic) | Porosity | Weight % Agglomerate | Weight % Bond |
| Experimental Wheels | | | | | | | |
| 2-1 (AV4) B14 | 4.7 | 1.596 | 36 | 14 (12.4) | 50 | 90.2 | 9.8 |
| 2-2 (AV4) C14 | 5.3 | 1.626 | 36 | 16 (14.4) | 48 | 88.8 | 11.2 |
| 2-3 (AV4) D14 | 5.7 | 1.646 | 36 | 18 (16.4) | 46 | 87.4 | 12.6 |

[a]The "Total" volume % of bond is the sum of the amount of vitrified binder material used to agglomerate the grain and the amount of organic resin bond used to make the grinding wheel. The "(organic)" volume % of bond is the portion of the Total volume % bond consisting of the organic resin added to the agglomerates to make the grinding wheel.

Grinding Tests

These experimental abrasive wheels were tested in two commercial grinding operations for the finishing of cold mill rolls. After being ground, these forged steel rolls will be used to roll and finish the surface of sheets of metal (e.g., steel). Commercial operations traditionally use shellac bonded commercial wheels (80 grit alumina abrasive grain is common) and these wheels normally are operated at 6500 sfpm, with a maximum speed of about 8000 sfpm. Grinding conditions are listed below and test results are shown in Tables 2-3 and 2-4.

Grinding Conditions A:
Grinding machine: Farrell Roll Grinder, 40 hp
Coolant: Stuart Synthetic w/water
Wheel speed: 780 rpm
Workpiece: Forged steel, tandem mill work rolls, hardness 842 Equotip, 82×25 inches (208×64 cm)
Workpiece (Roll) speed: 32 rpm
Traverse: 100 inch/min.
Continuous feed: 0.0009 inch/min.
End feed: 0.0008 inch/min.
Surface finish required: 18–30 Ra roughness, 160 peaks maximum Grinding Conditions B:
Grinding machine: Pomini Roll Grinder, 150 hp
Coolant: Stuart Synthetic w/water
Wheel Speed: 880 rpm
Workpiece: Forged steel, tandem mill work rolls, hardness 842 Equotip, 82×25 inches (208×64 cm)
Workpiece (Roll) speed: 32 rpm
Traverse: 100 inch/min.
Continuous feed: 0.00011 inch/min.
End feed: 0.002 inch/min.
Surface finish required: 18–30 Ra roughness, approx. 160–180 peaks

TABLE 2-3

Grinding Test Results/Grinding Conditions A

| Sample Test Parameter | Change in Diameter Inches | G-ratio | Wheel RPMs | Wheel Amps | # of grinding Passes | Roll Roughness Ra | # of Peaks on Roll |
|---|---|---|---|---|---|---|---|
| Experimental Wheel 2-1 | | | | | | | |
| Wheel Wear | 0.12 | 0.860 | 780 | 75 | 10 | 28 | 171 |
| Material Removed | 0.007 | | | | | | |
| Experimental Wheel 2-2 | | | | | | | |
| Wheel Wear | 0.098 | 1.120 | 780 | 90–100 | 10 | 22 | 130 |
| Material Removed | 0.0075 | | | | | | |
| Experimental Wheel 2-3 | | | | | | | |
| Wheel Wear | 0.096 | 1.603 | 780 | 120–150 | 10 | 23 | 144 |
| Material Removed | 0.0105 | | | | | | |

Under grinding conditions A, the experimental grinding wheels displayed excellent grinding performance, achieving significantly higher G-ratios than observed in past commercial operations under these grinding conditions with shellac bonded wheels. Based on past experience in roll grinding under grinding conditions A, experimental wheels 2-1, 2-2 and 2-3 would have been considered too soft (at Norton Company hardness grade values of B–D) to yield commercially acceptable grinding efficiency, thus these results showing excellent G-ratios were highly unusual. Moreover, roll surface finish was free of chatter marks and within the specifications for surface roughness (18–30 Ra) and number of surface peaks (approx. 160). The experimental wheels delivered a surface finish quality previously observed only with shellac bonded wheels.

A second grinding test of experimental wheel 2-3, under grinding conditions B, confirmed the surprising benefits of using the wheels of the invention in a commercial finishing roll cold grinding operation over an extended test period. Test results are shown below in Table 2-4.

TABLE 2-4

Grinding Test Results/Grinding Conditions B

| Experimental Wheel 2-4 | Change in Diameter inches | Wheel Speed sfpm | Wheel Amps | Continuous Feed inches/min. | End Feed inches | Roll Roughness Ra | # of Peaks On Roll |
|---|---|---|---|---|---|---|---|
| Roll 1 | | | | | | | |
| Wheel Wear | 0.258 | 5667 | 90 | 0.0009 | 0.0008 | 24 | 166 |
| Material Removed | 0.028 | | | | | | |
| Roll 2 | | | | | | | |
| Wheel Wear | 0.339 | 8270 | 105 | 0.0016 | 0.002 | 20 | 136 |
| Material Removed | 0.032 | | | | | | |
| Roll 3 | | | | | | | |
| Wheel Wear | 0.165 | 8300 | 110 | 0.0011 | 0.002 | 28 | 187 |
| Material Removed | 0.03 | | | | | | |
| Roll 4 | | | | | | | |
| Wheel Wear | 0.279 | 8300 | 115 | 0.0011 | 0.002 | 29 | 179 |
| Material Removed | 0.036 | | | | | | |
| Roll 5 | | | | | | | |
| Wheel Wear | 0.098 | 8300 | 115 | 0.0011 | 0.002 | 25 | 151 |
| Material Removed | 0.018 | | | | | | |
| Roll 6 | | | | | | | |
| Wheel Wear | 0.097 | 8300 | 115 | 0.0011 | 0.002 | | |

TABLE 2-4-continued

Grinding Test Results/Grinding Conditions B

| Experimental Wheel 2–4 | Change in Diameter inches | Wheel Speed sfpm | Wheel Amps | Continuous Feed inches/min. | End Feed inches | Roll Roughness Ra | # of Peaks On Roll |
|---|---|---|---|---|---|---|---|
| Material Removed Roll 7 | 0.016 | | | | | | |
| Wheel Wear Material Removed Roll 8 | 0.072 0.048 | 8300 | 115 | 0.0011 | 0.002 | | |
| Wheel Wear Material Removed Roll 9 | 0.094 0.011 | 8300 | 115 | 0.0011 | 0.002 | | |
| Wheel Wear Material Removed Roll 10 | 0.045 0.021 | 8300 | 115 | 0.0011 | 0.002 | | |
| Wheel Wear Material Removed Roll 11 | 0.128 0.017 | 8300 | 115 | 0.0011 | 0.002 | | |
| Wheel Wear Material Removed Roll 12 | 0.214 0.018 | 8300 | 115 | 0.0011 | 0.002 | | |
| Wheel Wear Material Removed Roll 13 | 0.12 0.018 | 8300 | 115 | 0.0011 | 0.002 | | |
| Wheel Wear Material Removed Roll 14 | 0.118 0.026 | 8300 | 115 | 0.0011 | 0.002 | | |
| Wheel Wear Material Removed Roll 15 | 1.233 0.03 | 8300 | 115 | 0.0011 | 0.002 | | |
| Wheel Wear Material Removed Roll 16 | 0.215 0.03 | 8300 | 115 | 0.0011 | 0.002 | | |
| Wheel Wear Material Removed Roll 17 | 0.116 0.018 | 8300 | 115 | 0.0011 | 0.002 | xxx | xxx |
| Wheel Wear Material Removed Roll 18 | 0.141 0.021 | 8300 | 115 | 0.0011 | 0.002 | xxx | xxx |
| Wheel Wear Material Removed Roll 19 | 0.116 0.01 | 8300 | 115 | 0.0011 | 0.002 | xxx | xxx |
| Wheel Wear Material Removed | 0.118 0.018 | 8300 | 115 | 0.0011 | 0.002 | | |

The cumulative G-ratio for experimental wheel 2-4 after grinding 19 rolls and wear of approximately three inches from the wheel diameter was 2.093. This G-ratio represents an improvement of 2–3 times the G-ratios observed for commercial grinding wheels (e.g., the shellac bonded wheels, C-6 and C-7 described in Example 1) used to grind rolls under Grinding Conditions A or B. The wheel rotational speed and rate of material removal exceeded that of comparative commercial wheels used in this roll grinding operation, thus further demonstrating the unexpected grinding efficiency possible with the grinding method of the invention. Roll surface finish achieved by the experimental wheel was acceptable under commercial production standards. Cumulative results observed after grinding 19 rolls confirm the steady state operation of the experimental wheel and the beneficial resistance of the wheel to development of wheel lobes, vibration and chatter as the wheel is consumed by the grinding operation.

We claim:

1. A method of grinding mill rolls, comprising the steps:
   a) providing a grinding wheel comprising abrasive grain, phenolic resin bond, 36 to 54 volume % porosity, a maximum cured density of 2.0 g/cc and a burst speed of at least 6000 sfpm;
   b) mounting the wheel on a roll grinding machine;
   c) bringing the wheel into contact with a rotating mill roll having a cylindrical surface;
   d) traversing the wheel across the surface of the mill roll, maintaining continuous contact of the wheel with the surface of the mill roll; and
   e) grinding the surface of the mill roll to a surface finish value of 10 to 50 Ra, while leaving the surface substantially free of feed lines, chatter marks and surface irregularities.

2. The method of claim 1, wherein the wheel is rotated at a speed of 4000 to 9500 sfpm.

3. The method of claim 1, wherein the wheel is rotated at a speed of 7000 to 9500 sfpm.

4. The method of claim 1, wherein grinding is carried out to a surface finish value of 18 to 30 Ra.

5. The method of claim 1, wherein the wheel has a maximum elastic modulus value of 10 GPa.

6. The method of claim 1, wherein the wheel has a maximum elastic modulus value of 8 GPa.

7. The method of claim 1, wherein the wheel comprises 22 to 40 volume % abrasive grain, 36 to 50 volume % porosity and 8 to 26 volume % phenolic resin bond.

8. The method of claim 1, wherein the wheel comprises 24 to 38 volume % abrasive grain, 40 to 50 volume % porosity and 12 to 22 volume % phenolic resin bond.

9. The method of claim 1, wherein the porosity of the wheel comprises at least 30 volume % interconnected porosity.

10. The method of claim 1, wherein the wheel is substantially free of pore inducer material.

11. The method of claim 1, wherein the wheel has a hardness grade of B to G on the Norton Company hardness grade scale.

12. The method of claim 1, wherein steps c) to e) are repeated for consecutive roll mills and wherein the wheel remains substantially free of chatter as the wheel is consumed by these repeated grinding steps.

13. The method of claim 1, wherein grinding is carried out to a surface finish peak count value of 160–180 peaks per inch.

14. A method of grinding mill rolls, comprising the steps:
   a) providing a grinding wheel comprising at least 20 volume % agglomerates of abrasive grain, organic resin bond and 38 to 54 volume % porosity;
   b) mounting the wheel on a roll grinding machine;
   c) bringing the wheel into contact with a rotating mill roll having a cylindrical surface;
   d) traversing the wheel across the surface of the mill roll, maintaining continuous contact of the wheel with the surface of the mill roll; and
   e) grinding the surface of the mill roll to a surface finish value of 10 to 50 Ra, while leaving the surface substantially free of feed lines, chatter marks and surface irregularities.

15. The method of claim 14, wherein the wheel is rotated at a speed of 4000 to 9500 sfpm.

16. The method of claim 14, wherein the wheel is rotated at a speed of 7000 to 9500 sfpm.

17. The method of claim 14, wherein grinding is carried out to a surface finish value of 18 to 30 Ra.

18. The method of claim 14, wherein the wheel has a maximum elastic modulus value of 10 GPa.

19. The method of claim 14, wherein the wheel has a maximum elastic modulus value of 8 GPa.

20. The method of claim 14, wherein the agglomerates of abrasive grain are porous sintered agglomerates of abrasive grain and inorganic binding material.

21. The method of claim 14, wherein the wheel comprises 20 to 38 volume % agglomerates of abrasive grain, 38 to 50 volume % porosity and 8 to 26 volume % organic resin bond.

22. The method of claim 14, wherein the wheel comprises 24 to 36 volume % abrasive grain, 40 to 50 volume % porosity and 10 to 24 volume % organic resin bond.

23. The method of claim 14, wherein the porosity of the wheel comprises at least 30 volume % interconnected porosity.

24. The method of claim 14, wherein the wheel is substantially free of pore inducer material.

25. The method of claim 14, wherein steps c) to e) are repeated for consecutive roll mills and wherein the wheel remains substantially free of chatter as the wheel is consumed by these repeated grinding steps.

26. The method of claim 14, wherein grinding is carried out to a surface finish peak count value of 160–180 peaks per inch.

27. The method of claim 14, wherein the wheel has a maximum density of 2.0 g/cc.

28. A method of grinding mill rolls, comprising the steps:
   a) providing a grinding wheel comprising 22 to 40 volume % abrasive grain and 36 to 54 volume % porosity bonded in an organic resin bond, and having a maximum elastic modulus value of 12 GPa and a minimum burst speed of 6000 sfpm;
   b) mounting the wheel on a roll grinding machine and rotating the wheel;
   c) bringing the wheel into contact with a rotating mill roll having a cylindrical surface;
   d) traversing the wheel across the surface of the mill roll, maintaining continuous contact of the wheel with the surface of the mill roll; and
   e) grinding the surface of the mill roll to a surface finish value of 10 to 50 Ra, while leaving the surface substantially free of feed lines, chatter marks and surface irregularities.

29. The method of claim 28, wherein the wheel is rotated at a speed of 4000 to 9500 sfpm.

30. The method of claim 28, wherein the wheel is rotated at a speed of 7000 to 9500 sfpm.

31. The method of claim 28, wherein grinding is carried out to a surface finish value of 18 to 30 Ra.

32. The method of claim 28, wherein the wheel has a maximum density of 2.0 g/cc.

33. The method of claim 28, wherein the wheel has a maximum elastic modulus value of 10 GPa.

34. The method of claim 28, wherein the wheel comprises 22 to 38 volume % abrasive grain, 36 to 50 volume % porosity and 8 to 26 volume % organic resin bond.

35. The method of claim 28, wherein the wheel comprises 24 to 36 volume % abrasive grain, 40 to 50 volume % porosity and 12 to 22 volume % organic resin bond.

36. The method of claim 28, wherein the porosity of the wheel comprises at least 30 volume % interconnected porosity.

37. The method of claim 28, wherein the wheel is substantially free of pore inducer material.

38. The method of claim 28, wherein the wheel has a hardness grade of B to G on the Norton Company hardness grade scale.

39. The method of claim 28, wherein steps c) to e) are repeated for consecutive roll mills and wherein the wheel remains substantially free of chatter as the wheel is consumed by these repeated grinding steps.

40. The method of claim 28, wherein grinding is carried out to a surface finish peak count value of 160–180 peaks per inch.

41. A method of grinding mill rolls, comprising the steps:
    a) providing a grinding wheel comprising 22 to 40 volume % abrasive grain and 36 to 54 volume % porosity bonded in an organic resin bond, and having a maximum elastic modulus value of 12 GPa and a minimum burst speed of 6000 sfpm;
    b) mounting the wheel on a roll grinding machine and rotating the wheel;
    c) bringing the wheel into contact with a rotating mill roll having a cylindrical surface;
    d) traversing the wheel across the surface of the mill roll, maintaining continuous contact of the wheel with the surface of the mill roll;
    e) grinding the surface of the mill roll; and
    f) repeating steps c) to e);
wherein the wheel remains substantially free of chatter as the wheel is consumed by the grinding steps.

42. The method of claim 41, wherein the wheel is rotated at a speed of 4000 to 9500 sfpm.

43. The method of claim 41, wherein the wheel is rotated at a speed of 7000 to 9500 sfpm.

44. The method of claim 41, wherein grinding is carried out to a surface finish peak countvalue of 160–180 peaks per inch.

45. The method of claim 41, wherein the wheel has a maximum density of 2.0 g/cc.

46. The method of claim 41, wherein the wheel has a maximum elastic modulus value of 10 GPa.

47. The method of claim 41, wherein the wheel comprises 22 to 38 volume % abrasive grain, 36 to 50 volume % porosity and 8 to 26 volume % organic resin bond.

48. The method of claim 41, wherein the wheel comprises 24 to 36 volume % abrasive grain, 40 to 50 volume % porosity and 12 to 22 volume % organic resin bond.

49. The method of claim 41, wherein the porosity of the wheel comprises at least 30 volume % interconnected porosity.

50. The method of claim 41, wherein the wheel is substantially free of pore inducer material.

51. The method of claim 41, wherein the wheel has a hardness grade of B to G on the Norton Company hardness grade scale.

52. The method of claim 41, wherein the wheel comprises at least 20 volume % agglomerates of abrasive grain, and the agglomerates of abrasive grain are porous sintered agglomerates of abrasive grain and inorganic binding material.

* * * * *